United States Patent [19]

Stoneham

[11] Patent Number: 4,647,170
[45] Date of Patent: Mar. 3, 1987

[54] APPARATUS AND METHOD FOR IDENTIFYING A FILM CARTRIDGE

[75] Inventor: Jeffrey R. Stoneham, Hilton, N.Y.

[73] Assignee: Eastman Kodak Company, Rochester, N.Y.

[21] Appl. No.: 781,616

[22] Filed: Sep. 30, 1985

[51] Int. Cl.⁴ .................... G03B 17/26; G03B 17/30
[52] U.S. Cl. .................................. 354/275; 354/288; 242/71.1
[58] Field of Search .............. 354/202, 212, 275, 288; 352/72, 78 R, 78 C; 242/71, 71.1, 71.2, 71.7

[56] References Cited

U.S. PATENT DOCUMENTS

| | | | |
|---|---|---|---|
| 3,672,277 | 6/1972 | Kobayashi | 354/212 |
| 3,722,387 | 3/1973 | Walther | 354/275 X |
| 4,338,015 | 7/1982 | Holmes | 354/275 |

Primary Examiner—William B. Perkey
Attorney, Agent, or Firm—Roger A. Fields

[57] ABSTRACT

A particular type camera requiring the exposed film to receive special handling at the photofinisher is adapted for use with a film cartridge which includes a film spool having an elongate coaxial hole open at one end of the spool. A plug is supported in the coaxial hole in the spool for movement along the hole from a predetermined location relatively close to the open end of the spool to another location further into the hole. When the cartridge is loaded in the camera, a plunger member of the camera is received in the coaxial hole to move the plug from the predetermined location to the other location. This will provide an indication to the photofinisher that the cartridge was used in the camera.

10 Claims, 17 Drawing Figures

| OPERATING MODE | PSEUDO PAN | ACTUAL ZOOM | | PSEUDO TELE (ZOOM) | | |
|---|---|---|---|---|---|---|
| CAMERA OBJECTIVE: | | | | | | |
| ACTUAL FOCAL LENGTH | 35mm | 35mm ↔ 80mm | | 80mm | 80mm | 80mm |
| MAGNIFICATION | 1.0X | 1.0X ↔ 2.3X | | 2.3X | 2.3X | 2.3X |
| EQUIVALENT FOCAL LENGTH | | SAME AS ACTUAL | | 120mm | 160mm | 200mm |
| MAGNIFICATION | 1.0X | 1.0X ↔ 2.3X | | 3.4X | 4.6X | 5.7X |
| FINDER IMAGE | 1:2 | 3½:5 | 3½:5 | 3½:5 | 3½:5 | 3½:5 |
| WIDTH-TO-LENGTH RATIO | | | | | | |
| PORTION OF NEGATIVE USED TO MAKE PRINT | 16.4×32.8mm | 23×32.8mm | 23×32.8mm | 16.4×23.4mm | 12.8×16.3mm | 9.2×13.1mm |
| PRINT SIZE | 3½×7ins | 3½×5ins | 3½×5ins | 3½×5ins | 3½×5ins | 3½×5ins |
| CODE FIDUIAL | 1000 | 0000 | 0000 | 0100 | 0010 | 0001 |

FIG.13

APPARATUS AND METHOD FOR IDENTIFYING A FILM CARTRIDGE

CROSS-REFERENCE TO RELATED APPLICATIONS

Reference is made to commonly assigned, copending patent application Ser. Nos. 765,977, filed Aug. 15, 1985 in the name of Donald M. Harvey and entitled PSEUDO FORMAT CAMERA AND SPECIAL FILM CARTRIDGE, 775,271, filed Sept. 12, 1985 in the name of Donald M. Harvey and entitled CAMERA DEVICE FOR ENCODING CONVENTIONAL FILM CARTRIDGE, and 775,296, filed Sept. 12, 1985 in the name of David E. Beach and entitled APPARATUS AND METHOD FOR IDENTIFYING A FILM CARTRIDGE USED IN A PARTICULAR TYPE CAMERA.

BACKGROUND OF THE INVENTION

1. Field of the Invention

The invention relates to an apparatus and a method for encoding a film cartridge to provide an indication that the cartridge was used in a particular type camera which requires the exposed film to receive special handling at the photofinisher. An example of such a camera is one that takes exposures for use in producing pseudo telephoto and pseudo panoramic prints. With a pseudo format camera, it is preferable to encode film cartridges used in the camera in order to correctly route the cartridges to special equipment at the photofinisher for producing pseudo format prints.

2. Description of the Prior Art

A pseudeo telephoto print is one that is made from a central portion of an exposure having the same width-to-length ratio, e.g., 3½:5, as that of the exposure. During the printing process, the negative is masked at its upper, lower, left and right marginal zones, leaving the central portion of the negative unobscured. Alternatively, the film gate in the enlarger may be correspondingly masked or adjusted. Then, an enlargement is made of the central portion of the negative to provide a print with the same width-to-length ratio as that of the central portion. Thus, the print will have a telephoto or close-up format.

A pseudo panoramic print is one that is made from a narrow portion of an exposure having a greater width-to-length ratio, e.g., 1:3, than that of the exposure. During the printing process, the negative is masked at its upper and/or lower marginal zones, leaving the narrow portion of the negative unobscured. Alternatively, the film gate in the enlarger may be correspondingly masked or adjusted. Then an enlargement is made of the narrow portion of the negative to provide a print with the same width-to-length ratio as that of the narrow portion. Thus, the print will have a panoramic or elongate format.

Commonly assigned U.S. Pat. No. 3,490,844, granted Jan. 20, 1970, discloses a method of making a print of a selected portion of a subject to be photographed. The method comprises the following steps: (1) viewing the subject in the viewfinder of a camera; (2) manually adjusting mechanical masking members visible in the viewfinder to frame a selected portion of the subject; (3) exposing the film in the camera to obtain a latent image of the subject; (4) encoding the exposure on the film with indicia which represents the selected portion of the subject; (5) processing the film to obtain a negative of the latent image of the subject; and (6) sensing the indicia to make a print of the selected portion of the subject from the negative.

When, in U.S. Pat. No. 3,490,844, the selected portion of the subject has the same relative position in the viewfinder as a corresponding portion of the exposure, enlargement of the portion in the negative will provide a pseudo telephoto effect similar to the actual telephoto effect provided by a telephoto lens. Thus, a pseudo telephoto print can be made during the printing process from an exposure taken without a telephoto lens.

Another patent, U.S. Pat. No. 4,357,102, granted Nov. 2, 1982, discloses a method of making a pseudo panoramic print from an exposure. According to the method, a window in the viewfinder of a camera has its upper and/or lower marginal zones masked off by an appropriate insert to provide a viewing area with a width-to-length ratio greater than 1:2 and preferably 1:3. Exposures are taken with the window partially masked and, during the printing of the negatives, the film gate in the enlarger is correspondingly masked or provided with an aperture of the same width-to-length ratio as that of the unobscured portion of the window. Printing paper with a similar width-to-length ratio is used. Prints can thus be obtained which have a panoramic or elongate format, without using a panoramic lens.

Although U.S. Pat. No. 3,490,844 discloses a method of making pseudo telephoto prints from exposures taken without a telephoto lens, and U.S. Pat. No. 4,357,102 discloses a method of making pseudo panoramic lens, in each instance the exposures are made on film in a conventional (standard) cartridge. Thus, unless otherwise provided by the photographer, there is no indication to the photofinisher that the conventional cartridge was used in a pseudo telephoto or pseudo panoramic camera rather than a regular format camera. During the photofinishing process, a cartridge containing film on which exposures have been made for use in producing pseudo telephoto or pseudo panoramic prints will be indistinguishable from a cartridge containing film on which exposures have been made for use in producing normal prints. Consequently, film on which exposures have been made for use in producing pseudo telephoto or pseudo panoramic prints may not be correctly routed to the special equipment described in the patents for producing pseudo format prints.

SUMMARY OF THE INVENTION

According to my invention, a film cartridge is encoded to provide an indication that the cartridge was used in a particular type camera which requires the exposed film to receive special handling at the photofinisher, such as in the example of the pseudo format camera. The film cartridge includes a film spool having an elongate coaxial hole open at one end of the spool. A plug is supported in the coaxial hole in the spool for movement along the hole from a predetermined location relatively close to the open end of the spool to another location further into the hole. When the cartridge is loaded in the camera, a plunger member of the camera is received in the coaxial hole to move the plug from the predetermined location to the other location. This will provide an indication to the photofinisher that the cartridge was used in the camera.

Alternatively, the plug can be displaced in the coaxial hole from the predetermined location to the other location in response to closing the back door of the camera. In such an embodiment, a cam-coupling may be arranged between the plunger member and the back door to actuate the plunger member.

Thus, with the invention, the photofinisher can readily identify the cartridge as one that was used in a particular type camera, such as the pseudo format camera, and the cartridge can then be routed to special equipment for producing pseudo format prints. When instead the cartridge is used with a regular format camera, the plug remains in the predetermined location in the coaxial hole in the spool, informing the photofinisher that the cartridge does not require special handling.

BRIEF DESCRIPTION OF THE DRAWINGS

The invention will be described in connection with the drawings, wherein:

FIG. 13 is a chart for explaining how pseudo telephoto and pseudo panoramic prints are produced from film exposed in the camera.

DESCRIPTION OF THE PREFERRED EMBODIMENT

The invention is disclosed as being embodied preferably in a single-lens-reflex (SLR) 35 mm camera having a zoom objective lens. Because such a camera and lens are well known, this description is directed in particular to photogaphic elements forming part of or cooperating directly with the disclosed embodiment. It is to be understood, however, that other elements not specifically shown or described may take various forms known to persons of ordinary skill in the art.

Figure 1:
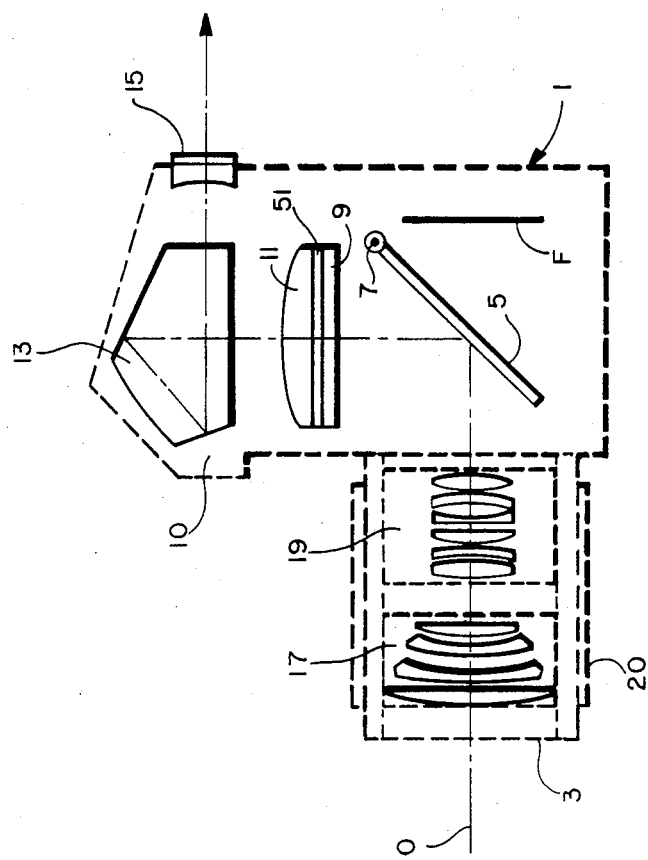
FIG. 1 is a schematic diagram of a single-lens-reflex (SLR) camera for taking exposures for use in producing pseudo telephoto and pseudo panoramic prints.

Referring now to the drawings, and in particular to FIG. 1, there is shown a single-lensreflex (SLR) 35 mm camera 1. The camera 1 includes an objective lens 3 for focusing an image of a subject being photographed on a frame section F of film in the camera. Conventional means, such as a pressure plate and a pair of rails, not shown, support the film frame F in the focal plane of the objective lens 3 to take an exposure. A flip-up mirror 5 is located between the objective lens 3 and the film frame F. The mirror 5 is normally disposed at an angle of 45°, centered on the optical axis 0 of the objective lens 3, but can flip up about a pivot pin 7 to lie flat. When the mirror 5 is disposed at the 45° angle, it reflects the rays of light that come through the objective lens 3 onto a ground glass screen 9 in a viewfinder 10 of the camera 1. A field lens 11 and a penta-roof prism 13 in the viewfinder 10 direct the light rays through an eye-lens 15 at the rear of the camera 1 to enable the subject to be photographed to be viewed through the objective lens 3. The prism 13 has three reflecting surfaces which turn the image formed by the objective lens 3 on the ground glass screen 9 upright as well as right-way-round. When the mirror 5 is flipped up to lie flat, it covers the underside of the ground glass screen 9 and the light rays from the objective lens 3 fall on the film frame F. The position of the mirror 5 is so arranged that when an image of the subject to be photographed is focused on the ground glass screen 9, with the mirror at the 45° angle, the same image falls into focus on the film frame F when the mirror is flipped out of the way. Finger pressure against a shutter release, not shown, on the outside of the body of the camera 1 flips the mirror 5 up. At first the light rays fall only on the blind of a focal plane shutter, not shown, but as the mirror 5 reaches the upper limit of its travel, it presses against a stop which releases the shutter blades to make the exposure.

Figure 9:
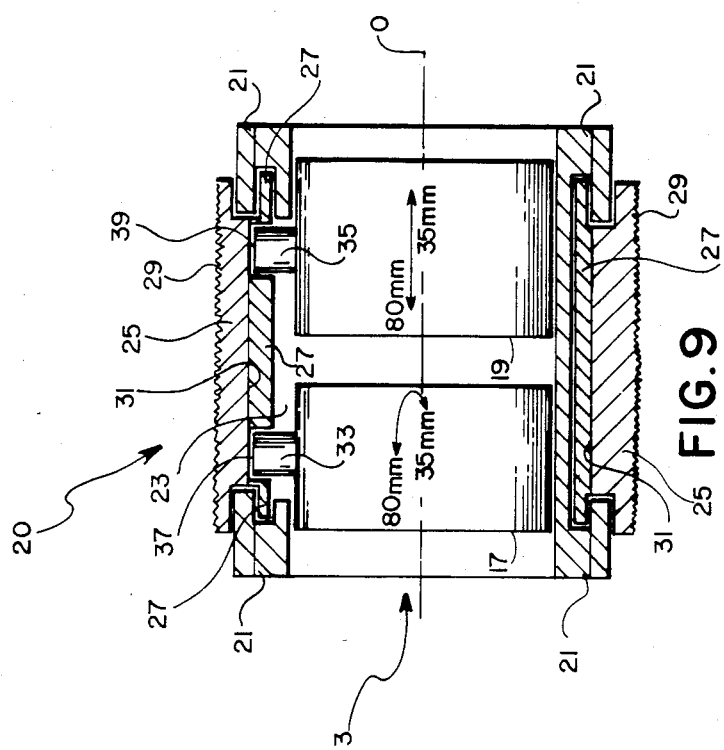
FIG. 9 is a partial sectional view of the camera objective and the manually operated member.
Figure 10:
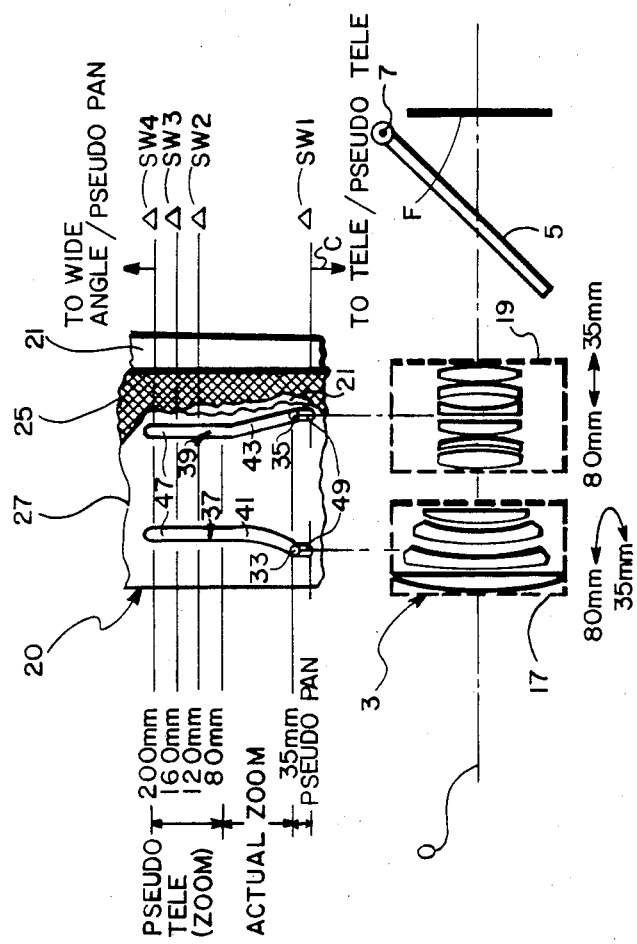
FIG. 10 is a schematic diagram of the camera objective and the manually operated member.

The objective lens 3 in the camera 1 is a known type of zoom lens, that is, a lens of variable focal length which can be adjusted continuously by movement of separate groups of elements in the lens to change the focal length of the lens. This is done in order to vary the angular field of view (coverage) of the objective lens 3 between a wide-angle limit and a telephoto limit. Alternatively, a lens assembly may be provided having a plurality of interchangeable elements for changing the focal length or angular field of view. As shown in FIGS. 1, 9 and 10, the objective lens 3 includes a front four-element section 17 which moves in a double action path along the optical axis 0, first back (rearward) and then forward as the focal length of the lens is changed from a wide angle limit of, for example, 35 mm, to a telephoto limit of, for example, 80 mm. Conversely, a rear six-element section 19 of the objective lens 3 moves forward along the optical axis 0 in an almost smooth, linear path as the focal length of the lens is adjusted from 35 mm to 80 mm. At the shortest focal length of the objective lens 3, i.e., the wide-angle limit 35 mm, the front and rear sections 17 and 19 of the lens are farthest apart and the angular field of view is approximately 63°. At the longest focal length of the objective lens 3, i.e., the telephoto limit 80 mm, the angular field of view is approximately 28°. Thus, the field range of the objective lens 3 is 63° to 28°.

Figure 8:
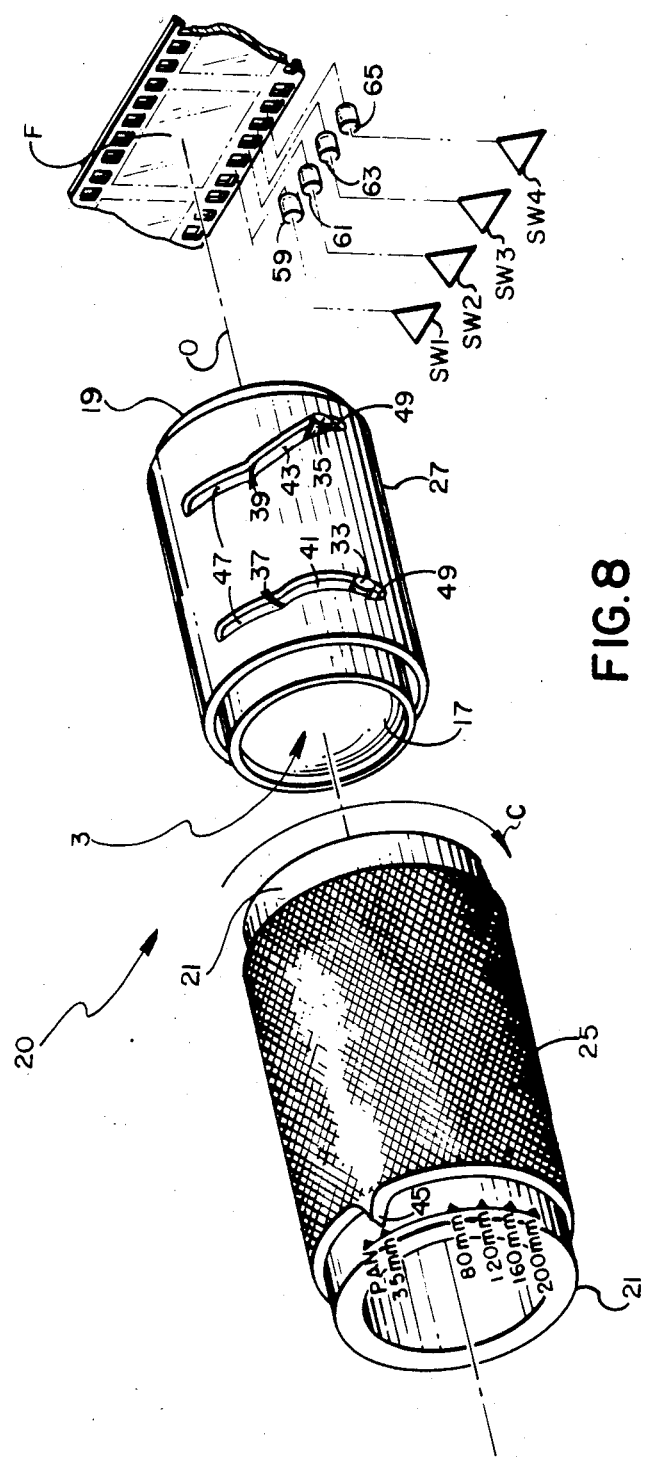
FIG. 8 is an exploded perspective view of the camera objective, a manually operated member for selecting a pseudo telephoto or pseudo panoramic field of view, and code means for encoding an exposure with indicia representative of the selected pseudo field of view.

Manually operated means 20 for moving the front and rear sections 17 and 19 of the objective lens 3 to adjust the lens to a selected focal length from 35 mm to 80 mm is shown in FIGS. 8-10. FIG. 8 shows the manually operated means 20 in an exploded perspective form. FIG. 9 shows such means 20 in a sectional form. FIG. 10 shows the means 20 in a rolled out (flat) elevational form. As seen in FIG. 9, a cylindrical barrel 21 fixed to the camera body supports the front and rear sections 17 and 19 of the objective lens 3 for movement along the optical axis O. The fixed barrel 21 has a semi-annular opening 23 which is bridged in light-trapping relation by an exterior zoom ring 25 and an interior cam ring 27. The zoom ring 25 has a knurled outer surface 29 and is secured at an inner surface 31 to the cam ring 27. The respective rings 25 and 27 are supported on exterior and interior surfaces of the barrel 21 for rotation relative to the barrel, about the front and rear sections 17 and 19 of the objective lens 3. The front and rear sections 17 and 19 have respective cam followers 33 and 35 which project into different-shaped cam slots 37 and 39 in the cam ring 27 to adjust the objective lens 3 from its 35 mm focal length to its 80mm focal length or vice-versa. The different shape of the cam slots 37 and 39, and respective settings of the cam ring 27 for adjusting the objective lens 3 to the 35 mm focal length and the 80 mm focal length, are depicted in FIGS. 8 and 10. When, as viewed in FIGS. 8 and 10, the cam ring 27 is rotated in a clockwise direction C (by turning the zoom ring 25 in the same direction) from the 35 mm setting to the 80 mm setting of the cam ring, the front section 17 of the objective lens 3 first moves rearward and then moves forward because of a curved segment 41 of the cam slot 37. Simultaneously, the rear section 19 of the objective lens 3 simply moves forward because of a straight, inclined segment 43 of the cam slot 39. This movement of the front and rear sections 17 and 19 adjusts the objective lens 3 to continuously change its focal length from 35 mm to 80 mm.

A pointer 45 is provided on the zoom ring 25 for alignment with respective visible indications of the 35 mm and 80 mm settings of the cam ring 27. As shown in FIG. 8, the indications are embossed on the outside of the cylindrical barrel 21.

As is apparent from FIG. 10, the cam ring 27 can be rotated in the clockwise direction C beyond its 80 mm setting (by similarly turning the zoom ring 25) to a plurality of pseudo telephoto settings, 120 mm, 160 mm and 200 mm, without moving the objective lens 3 from its longest (telephoto) focal length 80 mm. This is possible because of respective, non-inclined, identical dwell segments 47 in the two cam slots 37 and 39. Conversely, the cam ring 27 can be rotated in a counter-clockwise direction beyond its 35 mm setting (by similarly turning the zoom ring 25) to a pseudo panoramic setting, without moving the objective lens 3 from its shortest (wide-angle) focal length 35 mm. This is possible because of respective, non-inclined, identical dwell segments 49 in the two cam slots 37 and 39. Visible indications of the pseudo telephoto settings 120 mm, 160 mm and 200 mm of the cam ring 27 and the pseudo panoramic setting of the cam ring are embossed on the outside of the cylindrical barrel 21, beyond the 80 mm and 35 mm indications on the barrel, for alignment with the pointer 45 on the zoom ring 25.

Figure 11C:
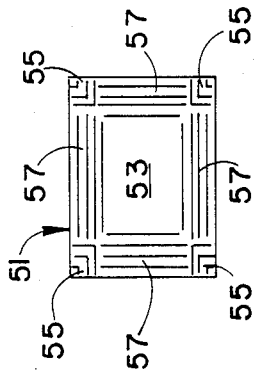
FIGS. 11a–11e are elevation views of the finder field in the viewfinder of the camera, illustrating operation of a liquid crystal display (LCD) masking unit for partially masking the viewing area in various degrees corresponding to the selected pseudo field of view.
Figure 11B:
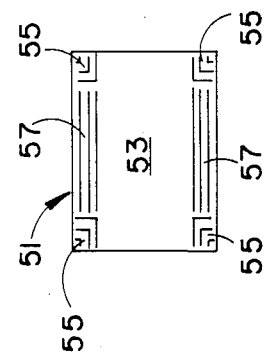
Figure 11A:
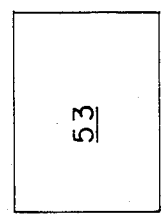
Figure 11E:
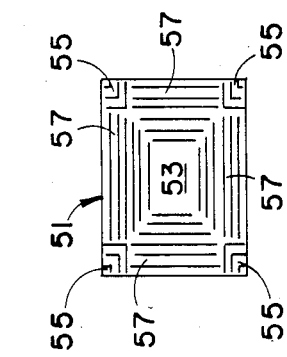
Figure 11D:
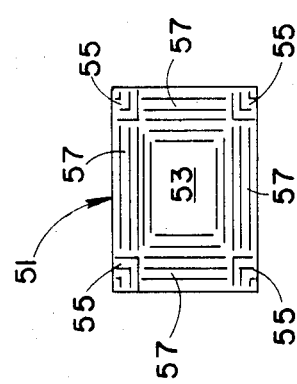

A flat, liquid crystal display (LCD) masking unit 51 is located in the viewfinder 10 of the camera 1 between the ground glass screen 9 and the field lens 11, as shown in FIG. 1. The LCD masking unit 51 is a variation of a known type of unit, such as described in U.S. Pat. No. 4,478,493, granted Oct. 23, 1984, and is depicted in FIGS. 11b-11e in various masking configurations in the finder field 53 of the viewfinder 10. The respective configurations corresponding to the pseudo panoramic and pseudo telephoto settings of the cam ring 27. As shown in FIG. 11e, the masking unit 51 comprises four sets of right-angle insulated strips 55 of transparent, electrically conductive material arranged in side-by-side relation in the respective corner zones of the finder field 53 and four sets of elongate insulated strips 57 of the same material arranged in side-by-side relation in the upper, lower, left and right marginal zones of the finder field. Preferably, each set of the right-angle strips 55 includes three strips, and each set of the elongate strips 57 includes six strips. When the right-angle strips 55 and the elongate strips 57 are selectively energized in accordance with the pseudo panoramic or pseudo telephoto settings of the cam ring 27, they are individually rendered opaque to partially mask the finder field 53 in various degrees, as shown in FIGS. 11b-11e. FIG. 11a illustrates the finder field 53 as it appears with the masking unit 51 de-energized, which is the situation when the cam ring 27 is rotated from its 35 mm setting to its 80 mm setting or vice-versa. In this instance, none of the right-angle strips 55 or the elongate strips 57 are visible in the finder field 53. FIG. 11b illustrates the finder field 53 as it appears with the masking unit 51 minimally energized to provide with the masking unit 51 minimally energized to provide a pseudo panoramic format, which is the situation when the cam ring 27 is in its pseudo panoramic setting. In this instance, three of the elongate strips 57 in the upper and lower marginal zones and all of the right-angle strips 55 in the corner zones are visible in the finder field 53. FIG. 11c illustrates the finder field 53 as it appears with the masking unit 61 further energized to provide a pseudo telephoto format akin to a 120 mm focal length, which is the situation when the cam ring 27 is in its 120 mm pseudo telephoto setting. In this instance, four of the elongate strips 57 in the upper, lower, left and right marginal zones and all of the right-angle strips 55 in the corner zones are visible in the finder field 53. FIG. 11d illustrates the finder field as it appears with the masking unit even further energized to provide a pseudo telephoto format akin to a 160 mm focal length, which is the situation when the cam ring is in its 160 mm pseudo telephoto setting. In this instance, five of the elongate strips in the marginal zones and all of the right-angle strips in the corner zones are visible in the finder field. FIG. 11e illustrates the finder field as it appears with the masking unit completely energized to provide a pseudo telephoto format akin to a 200 mm focal length, which is the situation when the cam ring is in its 200 mm pseudo telephoto setting. In this instance, all of the elongate strips and all of the right-angle strips are visible in the finder field.

In contrast to the electrically controlled LCD masking unit 51, a mechanically controlled masking unit may be provided in the viewfinder 10 of the camera 1. An example of a mechanical unit is shown in U.S. Pat. No. 3,212,422, granted Oct. 19, 1965. Alternatively, in place of the LCD masking unit 51, there may be provided a viewfinder having a manually operated carriage or slide on which is mounted a series of lenses and/or apertures of different sizes corresponding to the pseudo telephoto and pseudo panoramic formats. The slide would be supported for movement across the viewing axis of the viewfinder to locate the respective lenses and/or apertures at the axis to see a selected pseudo format in the viewfinder. In addition to the lenses and/or apertures for viewing the pseudo formats, the slide may include one or more lenses for viewing regular formats, e.g., 50 mm.

Four light emitting diodes (LED's) 59, 61, 63 and 65 are disposed in evenly spaced relation in the camera 1 for selective energization to spotexpose one of several possible code fiducials in binary form on a sensitive film area adjacent the film frame F, as shown in FIG. 8. Selective energization of the LED's 59, 61, 63 and 65 is controlled by individually closing respective switches SW1, SW2, SW3 and SW4. The closing of a switch SW1, SW2, SW3 or SW4 may be effected by a single closure member, not shown, on the cam ring 27 as the cam ring is positioned selectively in its pseudo panoramic and pseudo telephoto settings, i.e., pan, 120 mm, 160 mm amd 200 mm. The binary form of the resulting code fiducial adjacent the film frame F indicates the particular pseudo setting of the cam ring 27, that is, the selected pseudo format. When the cam ring 27 is in its pseudo panoramic setting, the switch SW1 is closed and the LED 59 is energized. Thus, the binary form of the code fiducial is 1000. When the cam ring 27 is in its 120 mm, 160 mm or 200 mm pseudo telephoto settings, the switches SW2, SW3 or SW4 are closed an the LED's 61, 63 or 65 are energized, respectively. Thus, the binary form of the code fiducial is 0100, 0010 or 0001. When the cam ring 27 is rotated from its 35 mm setting to its 80 mm setting or vice-versa, the switches SW1–SW4 are open and none of the LED's are energized. Thus, the binary form of the code fiducial is, in effect, 0000.

Although not shown, it may be desirable for the LED 59 to be energized each time the cam ring 27 is in a pseudo panoramic or pseudo telephoto setting. In this instance, the LED 59 would provide a reference or pseudo-indicator fiducial for use in the printing process, and the LED's 61, 63 and 65 would provide the code fiducials. Thus, the various codings might be 1000, 1100, 1010 and 1001 for the panoramic, 120 mm, 160 mm and 200 mm pseudo settings, respectively.

Besides controlling selective energization of the LED's 59, 61, 63 and 65 in accordance with rotation of the cam ring 27 to its pseudo panoramic and pseudo telephoto settings, the switches SW1–SW4 similarly control selective energization of the right-angle strips 55 and the elongate strips 57 of the LCD masking unit 51. Thus, the resulting code fiducial 1000, 0100, 0010 or 0001 adjacent the film frame F will be consistent with the masking configuration in the finder field 53 of the viewfinder 10.

Figure 12:
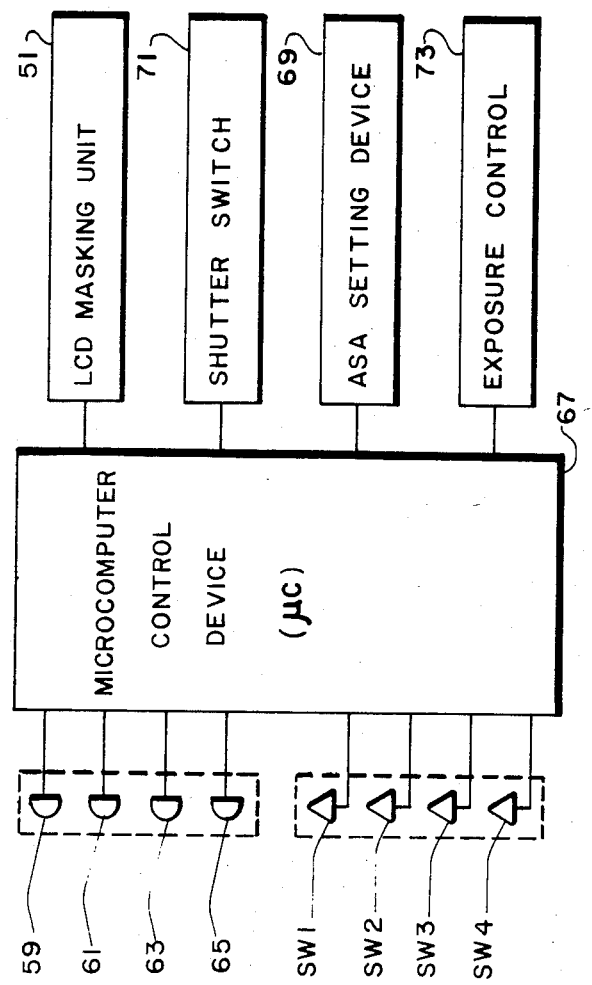
FIG. 12 is a schematic diagram of control circuitry in the camera.

FIG. 12 depicts a known microcomputer control device 67 which operatively couples the switches SW1–SW4 with the LCD masking unit 51 and the LED's 59, 61, 63 and 65. Examples of microcomputer-controlled cameras are disclosed in U.S. Pat. Nos. 4,295,715 and 4,509,843. A known ASA (film speed) setting device 69 is connected to the microcomputer device 67 to limit the intensity of an energized LED in accordance with the particular film speed of the 35 mm film loaded in the camera 1. A shutter switch 71 is connected to the microcomputer device 67 to delay energization of an LED, even though one of the switches SW1–SW4 is closed, until a focal plane shutter, not shown, is opened to take an exposure. When the focal plane shutter is opened, the shutter switch 71 is closed to energize an LED. Conversely, closing of the focal plane shutter causes the shutter switch 71 to re-open, thereby de-energizing the LED. A conventional exposure control circuit 73 is connected to the microcomputer device 67 to control the diaphragm aperture and the shutter speed. Such a circuit is disclosed, for example, in U.S. Pat. Nos. 4,493,547 and 4,515,457. The microcomputer device 67 may include a typical look-up table of exposure values which are individually selected according to which one of the switches SW1–SW4 is closed and the measure of brightness of reflected light provided by a photocell in the exposure control circuit 73. The selected exposure value is inputted to the exposure control circuit to set the diaphragm aperture and the shutter speed.

Referring now to FIG. 13, there is shown a chart for understanding how the camera 1 is used to exposure film frames from which pseudo panoramic and pseudo telephoto prints (as well as actual wide-angle to actual telephoto prints) can be obtained. For the most part, the chart is self-explanatory. For example, when the cam ring 27 is in its pseudo panoramic setting, the actual focal length of the objective lens 3 is the wide angle limit 35 mm. The finder field 53 is masked as indicated and the code fiducial 1000 is exposed adjacent the film frame F in response to the closing of the switch SW1. During the printing operation, sensing of the code fiducial 1000 causes the negative to be masked along its upper and lower marginal zones as indicated, in conformity with the masking of the finder field 53. An enlargement is made of the narrowed, non-masked portion of the negative, i.e., 16.4×32.8 mm, to provide a pseudo panoramic 3½×7 ins. print similar to one obtained from an exposure made with a panoramic (rather than a 35 mm) lens. When the cam ring 27 is in its 200 mm pseudo telephoto setting, the actual focal length of the objective lens 3 is the telephoto limit 80 mm. The finder field 53 is masked as indicated and the code fiducial 0001 is exposed adjacent the film frame F in response to the closing of the switch SW4. During the printing operation, sensing of the code fiducial 0001 causes the negative to be masked along its upper, lower, left and right marginal zones as indicated, in conformity with the masking of the finder field. An enlargement is made of the central, non-masked portion of the negative, i.e., 9.2×13.1 mm, to provide a pseudo telephoto 3½×5 ins. print similar to one obtained from an exposure made with a 200 mm (rather than a 80 mm) lens. When the cam ring 27 is in its 120 mm telephoto setting, the actual focal length of the objective lens 3 is the telephoto limit 80 mm. The finder field 53 is masked as indicated and the code fiducial 0100 is exposed adjacent the film frame F in response to the closing of the switch SW2. During the printing operation, sensing of the code fiducial 0100 causes the negative to be masked along its upper, lower, left and right marginal zones as indicated, in conformity with the masking of the finder field. An enlargement is made of the central, non-masked portion of the negative, i.e., 16.4×23.4 mm, to provide a pseudo telephoto 3½×5 ins. print similar to one obtained from an exposure made with a 120 mm (rather than a 80 mm) lens. When the cam ring is rotated from its 35 mm setting to its 80 mm setting or vice-versa, the focal length of the objective lens 3 is continuously changed between 35 mm and 80 mm. The finder field is not masked and no code fiducial (0000) is exposed on the film frame F, since each of the switches SW1–SW4 is open. Thus, an enlargement is made of a substantial portion of the negative, i.e., 23×32.8 mm.

Figure 5:
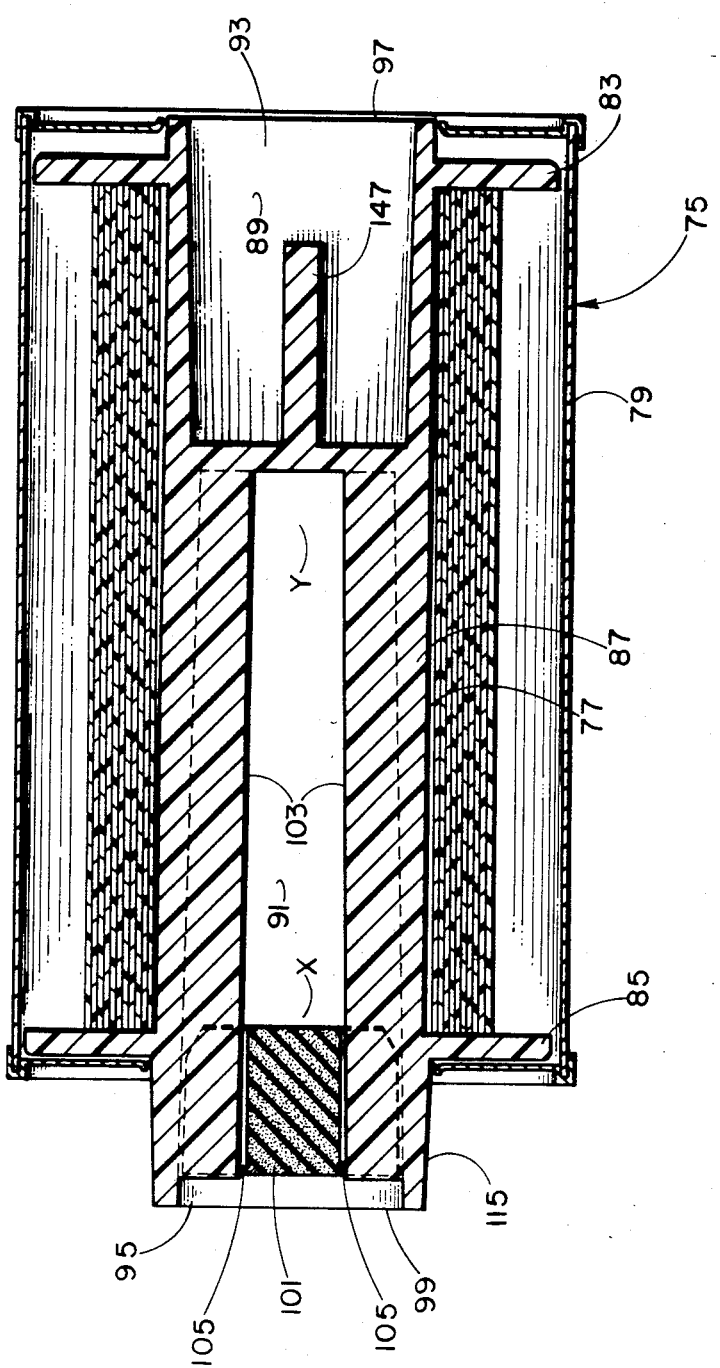
FIG. 5 is a cross-section view of the cartridge as indicated by the section line 5—5 in FIG. 3.

FIGS. 2–5 depict a film cartridge 75 for use with the pseudo format camera 1. The film in the cartridge 75 is wound on a spool 77 which is rotatable within a cylindrical light-tight container 79. A leading end portion, i.e., the leader L, of the film protrudes from a light-trapped slit or "mouth" 81 in the cylindrical container 79. As shown in FIG. 5, the spool 77 includes a pair of parallel spaced, annular flanges 83 and 85 and a core 87 extending between the flanges. The core 87 has a relatively short coaxial hole 89 and a realtively long coaxial hole 91. Respective openings 93 and 95 to the shorter and longer coaxial holes 89 and 91 are disposed at opposite ends 97 and 99 of the core 87. The two end openings 93 and 95 are accessible from outside of the cylindrical container 79 to gain entry into the shorter and longer coaxial holes 89 and 91.

According to a preferred embodiment of the invention, a plug 101 is initially positioned at a predetermined location X in the longer coaxial hole 91, proximate the end opening 95 to the hole, as shown in FIG. 5. The plug 101, in its initial position at the location X, provides an indication to the photofinisher that the cartridge 75 has not been used in the pseudo format camera 1. A pair of spaced ribs 103 integrally formed with the core 87 converge inwardly in the longer coaxial hole 91. The two ribs 103 are disposed in respective grooves 105 in the plug 101 to support the plug for movement further into the longer coaxial hole 91. The plug 101 is constructed of a compressible material, such as Styrofoam ®, and therefore will become firmly wedged in place at another location Y between the converging ribs 103 in response to movement of the plug further into the longer coaxial hole 91. In its second position at the location Y, the plug 101 provides an indication to the photofinisher that the cartridge 75 was used in the pseudo format camera 1.

Thus, with the plug 101 in its second position at the location Y, the photofinisher can readily identify the cartridge 75 as one that was used in the pseudo format camera 1, and the cartridge can then be routed to special equipment for producing pseudo format prints. When instead the cartridge 75 is used with a regular format camera, the plug 101 remains in its initial position at the location X, informing the photofinisher that the cartridge does not require special handling.

Figure 6:
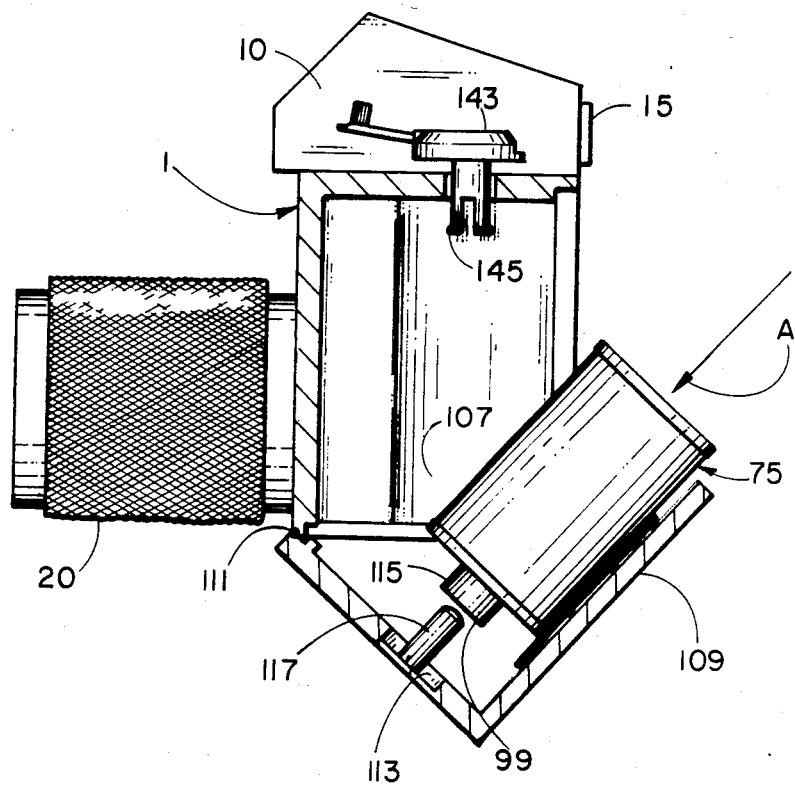
FIG. 6 is an end elevation view, partly in section, of the camera depicted in FIG. 1, illustrating a means according to a preferred embodiment of the invention for moving the plug in the cartridge to provide an indication that the cartridge was used in the camera.

The body of the pseudo format camera 1 includes a loading chamber 107, partially formed by a back door 109, for receiving the cartridge 75 in an axial direction indicated by an arrow A in FIG. 6. The door is supported for opening and closing movement about a pivot pin 111. A recess 113 is formed in the bottom of the loading chamber 107, specifically in the door 109, to receive a short extension 115 of the core 87. The short extension 115 extends from the cylindrical container 79 to permit the spool 77 to be manually rotated and includes the end opening 95 to the longer coaxial hole 91 in the core 87. When the door 109 is opened and the cartridge 75 is inserted into the loading chamber 107 in the axial direction A, a fixed plunger member 117 projecting into the chamber from the recess 113 enters the longer coaxial hole 91, through the end opening 95 in the short extension 115. The plunger member 117 pushes the plug 101 along the coaxial hole 91 from the predetermined location X to the other location Y, thereby providing an indication to the photofinisher that the cartridge 75 was used in the pseudo format camera 1.

Figure 7:
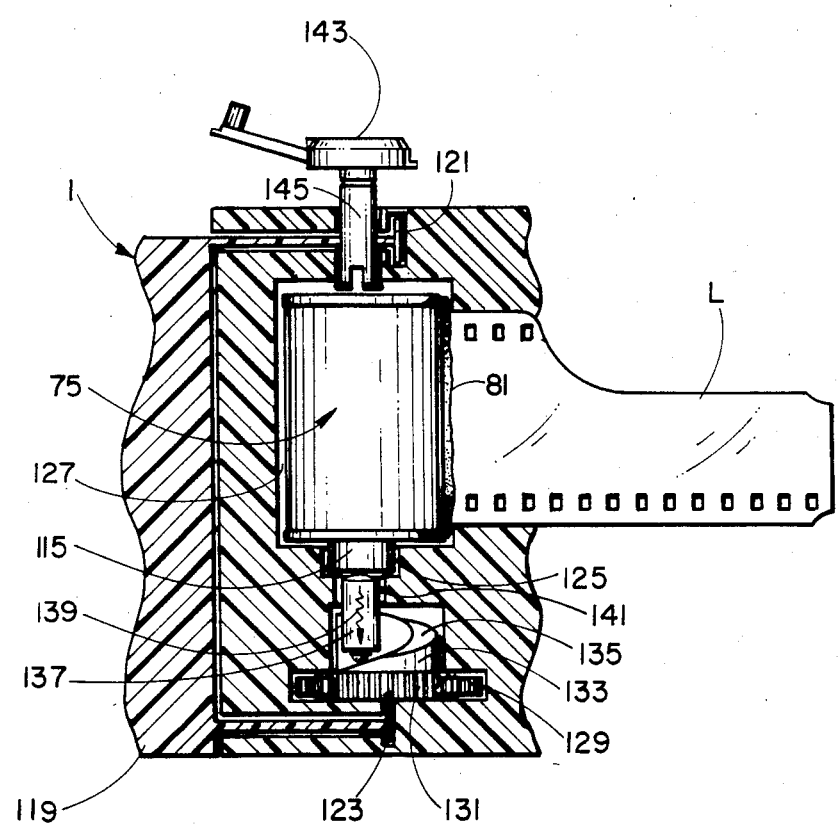
FIG. 7 is a rear elevation view of the camera, partly in section, illustrating an alternate embodiment of the means.

Alternatively, as shown in FIG. 7, the plug 101 can be displaced in the longer coaxial hole 91 from the predetermined location X to the other location Y in response to closing the back door of the pseudo format camera. In this instance, the body of the pseudo format camera includes a back door 119 which is supported for opening and closing movement via a pair of spaced pivot pins 121 and 123 that rotate as the door is moved. A recess 125 is formed in the bottom of a loading chamber 127 to receive the short extension 115 of the core 87 as the cartridge 75 is inserted sidewise into the loading chamber. When the door 119 is opened to permit the cartridge 75 to be placed in the loading chamber 127, a drive gear 129 coaxially fixed to the pivot pin 123 is rotated with the pin to rotate a mating gear 131. The mating gear 131 in turn rotates a coaxial cam wheel 133. The cam wheel 133 has a uniform radius, helical ramp 135 against which a movable plunger member 137 is urged by a schematically shown spring 139. Rotation of the cam wheel 133 in response to opening movement of the door 119 permits the spring 139 to urge the plunger member 137 through an aperture 141 at the bottom of the recess 125, removing the plunger member from the recess and thereby providing space for the short extension 115 of the core 87. When the door 119 is closed, with the cartridge 75 in the loading chamber 127, the two gears 129 and 131 and the cam wheel 133 are rotated to raise the plunger member 137 through the aperture 141 and into the recess 125. As a result, the plunger member 137 enters the longer coaxial hole 91 through the end opening 95 in the short extension 115. The plunger member 137 pushes the plug 101 further into the coaxial hole 91 from the predetermined location X to the other location Y, thereby providing an indication to the photofinisher that the cartridge 75 was used in the pseudo format camera.

Each of the embodiments shown in FIGS. 6 and 7 includes a rewind knob 143 for rewinding exposed film into the cartridge 75 after the length of film has been exposed in the pseudo format camera. As is typical, the rewind knob 143 includes a keyed shaft 145 which is inserted in the shorter coaxial hole 89 in the core 87 to engage a mating rib 147 in the coaxial hole. The rib 147 is integrally formed with the core 87 as shown in FIG. 5.

Figure 2:
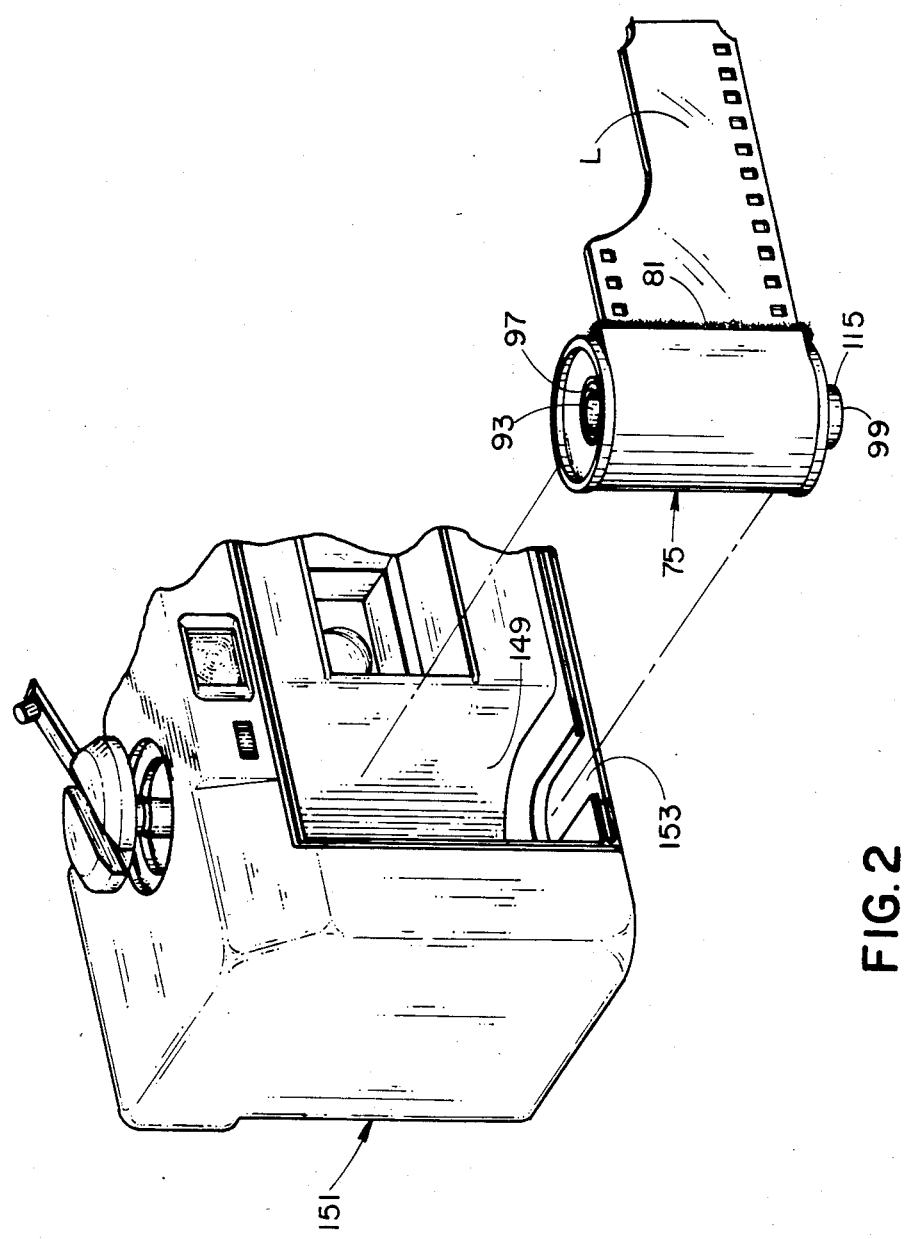
FIG. 2 is a rear elevation view of a prior art camera and a film cartridge according to a preferred embodiment of the invention, illustrating the manner in which the cartridge may be loaded into the prior art camera.
Figure 3:
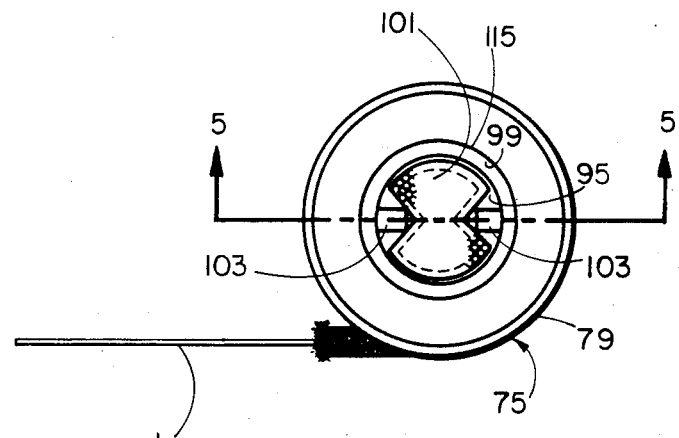
FIG. 3 is an end view of the cartridge illustrating a plug movable in a coaxial hole in a spool of the cartridge.
Figure 4:
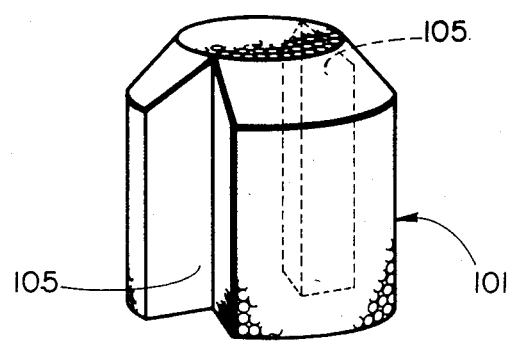
FIG. 4 is a perspective view of the movable plug.

When, as depicted in FIG. 2, the cartridge 75 is inserted into a loading chamber 149 of a regular format camera 151, there is no plunger member in a recess 153 at the bottom of the chamber. Thus, the plug 101 will remain in its initial position at the predetermined location X, informing the photofinisher that the cartridge was used in a regular format camera and therefore does not require special handling.

Apparatus at the photofinisher for determining whether the plug 101 has been moved from its initial position at the predetermined location X to its second position at the other location Y may include a probe which is inserted into the longer coaxial hole 91 in the core 87 to sense the particular position of the plug. A read-out device coupled to the probe would provide respective visible or audible signals, for example, corresponding to the two possible positions of the plug 101. Alternatively, a simple visual inspection of the coaxial hole 91 is sufficient to determine whether the probe 101 has been moved from the predetermined location X to the other location Y.

While the invention has been described with reference to a preferred embodiment, it will be understood that various modifications may be effected with the ordinary skill in the art without departing from the scope of the invention. For example, instead of including a plunger member in the pseudo format camera to move the plug 101 from the predetermined location X to the other location Y, the photographer could manually move the plug (using a separate plunger member) before loading the cartridge 75 in the camera. Also, the plug 101 could be color or otherwise coded to identify the film speed or other film-related information.

Several commonly assigned, copending applications are cross-referenced above for informational purposes. These applications disclose various other means for identifying a film cartridge used in the pseudo format camera.

I claim:

1. An improved film cartridge for use with a particular type camera, wherein said cartridge is of the type including a film spool having an elongate coaxial hole, and wherein the improvement comprises:
   a plug initially positioned at a predetermined location in said coaxial hole to indicate that said cartridge has not been used in the particular type camera; and
   means arranged within said coaxial hole for supporting said plug for movement along the hole from the predetermined location to another location, whereby an indication will be provided that said cartridge was used in the particular type camera.

2. An improved film cartridge for use with a particular type camera, wherein said cartridge is of the type including a film spool with a core having an elongate coaxial hole open at one end of the spool, and wherein the improvement comprises:
   a plug initially positioned in said coaxial hole relatively close to the open end of said spool to indicate that said cartridge has not been used in the particular type camera; and
   means arranged within said coaxial hole for supporting said plug for movement further into the hole, whereby an indication will be provided that said cartridge was used in the particular type camera.

3. The improvement as recited in claim 2, wherein said plug is constructed of a compressible material, and said supporting means includes a pair of spaced ribs converging inwardly in said coaxial hole to compress said plug and firmly wedge it in place in response to movement of the plug further into the hole.

4. The improvement as recited in claim 3, wherein said plug includes respective grooves for receiving said ribs to guide the plug for movement along said coaxial hole.

5. A method of indicating that a film cartridge was used in a particular type camera, wherein the cartridge includes (a) a film spool having an elongate coaxial hole open at one end of the spool and (b) a plug supported in the hole for movement along the hole from a predetermined location relatively close to the open end to another location further into the hole, said method comprising:
   inserting a plunger member into the coaxial hole at the open end of the spool; and
   moving the plunger along the coaxial hole to move the plug from the predetermined location to the other location, whereby an indication will be provided that the cartridge was used in the particular type camera.

6. A photographic camera for use with a film cartridge including (a) a film spool having an elongate coaxial hole open at one end of the spool and (b) a plug supported in the hole for movement along the hole from a predetermined location relatively close to the open end to another location further into the hole, said camera comprising:
   means including a plunger member receivable in the coaxial hole at the open end of the spool for moving the plug along the hole from the predetermined location to the other location, whereby an indication will be provided that the cartridge was used in the camera.

7. A photographic camera for use with a film cartridge including (a) a film spool having an elongate coaxial hole open at one end of the spool and (b) a plug supported in the hole for movement along the hole from a predetermined location relatively close to the open end to another location further into the hole, said camera comprising:
   means defining a loading chamber for receiving the film cartridge in an axial direction; and
   means projecting into said loading chamber for receipt in the coaxial hole at the open end of the spool in response to loading the cartridge in the axial direction into the chamber for moving the plug along the hole from the predetermined location to the other location, whereby an indication will be provided that the cartridge was used in the camera.

8. A photographic camera for use with a film cartridge including (a) a film spool having an elongate coaxial hole open at one end of the spool and (b) a plug supported in the hole for movement along the hole from a predetermined location relatively close to the open end to another location further into the hole, said camera comprising:
   means including a plunger member receivable in the coaxial hole at the open end of the spool for moving the plug along the hole from the predetermined location to the other location to provide an indication that the cartridge was used in the camera; and
   manually operated means for moving said plunger member into the coaxial hole to move the plug.

9. A photographic camera for use with a film cartridge including (a) a film spool having an elongate coaxial hole open at one end of the spool and (b) a plug supported in the hole for movement along the hole from a predetermined location relatively close to the open end to another location further into the hole, said camera comprising:
   means including a plunger member receivable in the coaxial hole at the open end of the spool for moving the plug along the hole from the predetermined location to the other location to provide an indication that the cartridge was used in the camera;
   a back door supported for closing movement; and
   means for coupling said plunger member and said back door to move the plunger member into the coaxial hole in response to closing movement of the back door.

10. An improved combination of a photographic camera and a film cartridge of the type including a film spool having an elongate coaxial hole open at one end of said spool, wherein the improvement comprises:
   said cartridge including a plug supported in said coaxial hole for movement along the hole from a predetermined location relatively close to the open end of said spool to another location further into the hole; and said camera including means receivable in said coaxial hole at the open end of said spool for moving said plug along the hole from the predetermined location to the other location, whereby an indication will be provided that the cartridge was used in the camera.

* * * * *